(12) United States Patent
Erlacher et al.

(10) Patent No.: US 10,946,468 B2
(45) Date of Patent: Mar. 16, 2021

(54) TOOL AND METHOD FOR JOINING MATERIAL LAYERS

(71) Applicant: MAGNA STEYR Fahrzeugtechnik AG & Co KG, Graz (AT)

(72) Inventors: Manuel Erlacher, Radenthein (AT); Bernhard Hofer, Graz (AT); Martin Rodler, Krottendorf (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 366 days.

(21) Appl. No.: 15/881,130

(22) Filed: Jan. 26, 2018

(65) Prior Publication Data

US 2018/0147651 A1    May 31, 2018

Related U.S. Application Data

(62) Division of application No. 13/670,503, filed on Nov. 7, 2012, now abandoned.

(30) Foreign Application Priority Data

Nov. 7, 2011    (DE) ............................. 2011117962.7

(51) Int. Cl.
*B23K 11/00* (2006.01)
*B23K 11/20* (2006.01)
(Continued)

(52) U.S. Cl.
CPC ............. *B23K 11/00* (2013.01); *B21J 15/025* (2013.01); *B21J 15/08* (2013.01); *B21J 15/147* (2013.01); *B23K 9/20* (2013.01); *B23K 11/0046* (2013.01); *B29C 65/562* (2013.01); *B29C 65/564* (2013.01); *B29C 65/64* (2013.01); *B29C 65/7841* (2013.01); *B29C 66/1122* (2013.01); *B29C 66/21* (2013.01); *B29C 66/41* (2013.01); *B29C 66/43* (2013.01); *B29C 66/7212* (2013.01); *B29C 66/742* (2013.01); *B29C 66/81431* (2013.01); *B29C 66/8322* (2013.01);
(Continued)

(58) Field of Classification Search
CPC .......... F16B 5/04; F16B 5/08; B23K 11/0066; B23K 11/20; B23K 2103/18
See application file for complete search history.

(56) References Cited

U.S. PATENT DOCUMENTS 1,587,445 A    6/1926    Thomson
1,873,619 A    8/1932    Mojonnier
(Continued)

FOREIGN PATENT DOCUMENTS

CN    101192656 A    6/2008
CN    101653861 A    2/2010
(Continued)

*Primary Examiner* — Robert J Utama
*Assistant Examiner* — Lawrence H Samuels
(74) *Attorney, Agent, or Firm* — Jordan IP Law, LLC; Todd A. Vaughn

(57) ABSTRACT

A tool configured to join at least two material layers, of which at least one material layer is in the form of a metal material layer, by a pin. The tool includes a driving-in device which drives the pin through the at least two material layers to be joined, and a welding device which, after the driving-in of the pin, welds at least one first section of the pin to the at least one metal material layer.

15 Claims, 3 Drawing Sheets

(51) Int. Cl.
*B23K 9/20* (2006.01)
*B21J 15/02* (2006.01)
*B21J 15/08* (2006.01)
*B29C 65/00* (2006.01)
*B29C 65/78* (2006.01)
*B21J 15/14* (2006.01)
*B29C 65/56* (2006.01)
*B29C 65/64* (2006.01)
*F16B 5/07* (2006.01)
*B23K 103/18* (2006.01)
*B23K 103/00* (2006.01)
*B23K 103/16* (2006.01)
*F16B 5/04* (2006.01)

(52) U.S. Cl.
CPC .......... *F16B 5/07* (2013.01); *B23K 2103/172* (2018.08); *B23K 2103/18* (2018.08); *B23K 2103/42* (2018.08); *B29C 66/8242* (2013.01); *F16B 5/04* (2013.01)

(56) References Cited

U.S. PATENT DOCUMENTS

| | | | | |
|---|---|---|---|---|
| 1,900,161 | A | | 3/1933 | Morris |
| 2,957,237 | A | | 10/1960 | Regle et al. |
| 3,524,042 | A | * | 8/1970 | Bennett ................ B21J 15/08 219/150 R |
| 3,747,382 | A | | 7/1973 | McMaster et al. |
| 3,854,030 | A | * | 12/1974 | Roye .................... B21J 15/02 219/72 |
| 3,878,356 | A | * | 4/1975 | Roye .................... B21J 15/08 219/150 V |
| 4,614,855 | A | * | 9/1986 | Hinden ............ B23K 11/0046 219/86.9 |
| 4,766,283 | A | * | 8/1988 | McCorvey ........ B23K 11/0046 219/119 |
| 4,855,561 | A | * | 8/1989 | Hinden ............ B23K 11/0046 219/93 |
| 4,855,562 | A | * | 8/1989 | Hinden ............ B23K 35/0288 219/93 |
| 5,739,498 | A | * | 4/1998 | Sunamoto .......... B23K 11/0046 219/78.15 |
| 5,752,305 | A | | 5/1998 | Cotterill et al. |
| 5,773,783 | A | | 6/1998 | Bowerman |
| 6,694,597 | B2 | | 2/2004 | Wang |
| 6,836,948 | B2 | | 1/2005 | Wang |
| 6,910,263 | B2 | | 6/2005 | Naito |
| 7,267,736 | B2 | | 9/2007 | Hou |
| 7,870,656 | B2 | | 1/2011 | Eberlein |
| 2004/0148760 | A1 | * | 8/2004 | Wang .................... B21J 15/025 29/525.06 |
| 2004/0164124 | A1 | * | 8/2004 | Lundstrom ............ B21J 15/02 228/135 |
| 2004/0216304 | A1 | | 11/2004 | Naito |
| 2005/0133483 | A1 | | 6/2005 | Hou et al. |
| 2005/0140158 | A1 | * | 6/2005 | Ogawa .................. B62D 25/07 296/29 |
| 2005/0161965 | A1 | | 7/2005 | Eberlein |
| 2009/0139821 | A1 | | 6/2009 | Koppitz et al. |
| 2009/0294410 | A1 | * | 12/2009 | Iwase .................... B21J 15/025 219/91.23 |
| 2010/0018027 | A1 | | 1/2010 | Stevenson et al. |
| 2013/0248083 | A1 | | 9/2013 | Takahashi et al. |
| 2015/0258624 | A1 | | 9/2015 | Draht et al. |
| 2015/0362004 | A1 | * | 12/2015 | Campbell ............ B21J 15/025 411/502 |
| 2018/0354231 | A1 | * | 12/2018 | Iwase ................... B32B 15/016 |

FOREIGN PATENT DOCUMENTS

| | | | |
|---|---|---|---|
| CN | 101890564 A | | 11/2010 |
| DE | 102008044451 A1 | | 2/2010 |
| DE | 102011009700 A1 | | 11/2011 |
| JP | 58059034 A | | 4/1983 |
| WO | WO-2011042176 A1 | * | 4/2011 .......... B29C 65/562 |

* cited by examiner

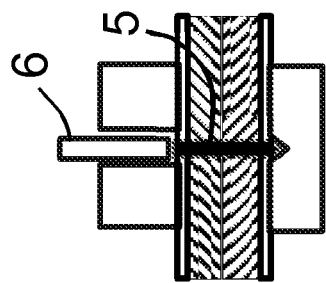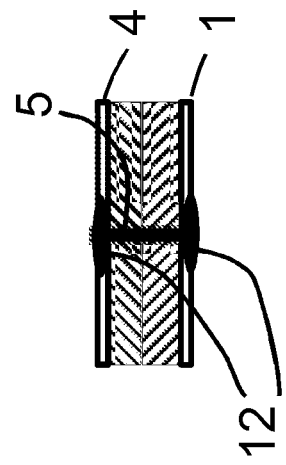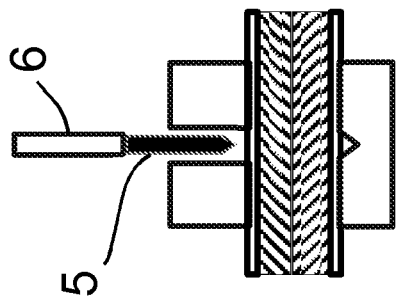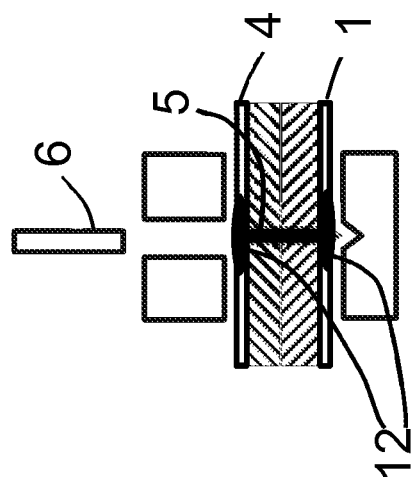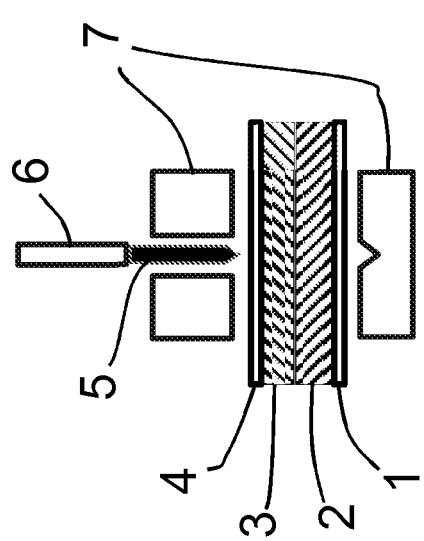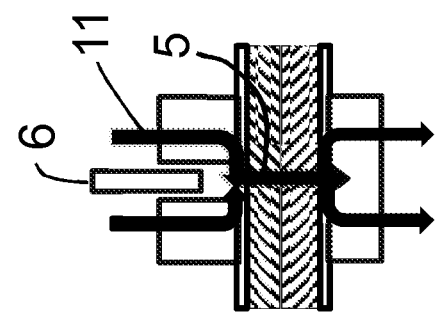

TOOL AND METHOD FOR JOINING MATERIAL LAYERS

CROSS-REFERENCE TO RELATED APPLICATIONS

The present application is a divisional of U.S. patent application Ser. No. 13/884,616 (filed May 10, 2013), which claims priority under 35 U.S.C. § 119 to German Patent Application No. DE 10 2011 117 962.7 (filed on Nov. 7, 2011), which are each hereby incorporated by reference in their complete entireties.

FIELD OF THE INVENTION

The present invention relates to a tool for joining at least two material layers, of which at least one material layer is in the form of a metal material layer, by a pin, and to a method for joining at least two material layers, of which at least one material layer is in the form of a metal material layer, by a pin.

BACKGROUND OF THE INVENTION

Methods of this type for connecting material layers are used, for example, in the car industry and especially in the production of motor vehicles and components thereof of composite construction. For example, it may be necessary in this case to fasten plastics parts or add-on parts made of glass-fibre-reinforced plastic (GFRP) to body components made of steel sheet.

As is known, connections of this type may be produced, for example, by mechanical riveting, wherein the rivet penetrates a first material layer and merely deforms a second material layer. Furthermore, in order to join metal material layers, spot welding is known, by way of which metal layers are melted in a locally small area and are welded to each other by the subsequent solidification. Furthermore, the use of a nail is known, said nail being driven through two material layers to be connected and thereby, by way of a form-fitting connection and also by way of a frictional connection via the dynamic effect at the head end of said nail, being able to produce a permanent connection between the material layers. In this case, the nail has relatively little resistance against being pulled out axially from the material layers.

A method for joining two joining parts, in particular flat materials, of the type in question is known from DE 10 2004 025 492 A1. In this method, a joining element, in particular a rivet, is driven through one of the joining parts. The rivet bears against the second joining part, subjects the latter to a mechanical load, or, in accordance with one embodiment, even brings about a notch in the second joining part. In a subsequent welding process, current is then conducted into the contact points between the joining element and joining part and the latter are thereby welded. For this purpose, use is advantageously made of conventional welding tongues.

Furthermore, a joining force between the joining parts and the joining element is applied by two electrodes, between which the joining parts are clamped. A disadvantage of this known joining method is that the connection to the second joining part is not very stable and, in particular, only small shearing forces, if any at all, from the second joining part can be absorbed. Furthermore, only a small pressure can be exerted on the joining element by the tool used.

SUMMARY OF THE INVENTION

It is, therefore, an object of the invention to provide a tool and a method for joining at least two material layers, which tool and method are enhanced in this respect and in particular permit simple and secure joining of the material layers.

The object is achieved by a tool for joining at least two material layers, of which at least one material layer is in the form of a metal material layer, by a pin, comprising a driving-in device and a welding device, wherein the driving-in device is designed to drive the pin through the at least two material layers to be joined, and the welding device is designed so as, after the driving-in of the pin, to weld at least one first section of the pin to a metal material layer.

The object is also achieved by a method for joining at least two material layers, of which at least one material layer is in the form of a metal material layer, by a pin, wherein, with a tool in accordance with the invention, the pin is driven through the at least two material layers to be joined and, after the driving-in of the pin, at least one first section of the pin is welded to a metal material layer.

In accordance with embodiments, a tool is configured to join at least two material layers, of which at least one material layer is composed of a metal, the tool including at least one of: a driving-in device configured to drive a pin through the at least two material layers to be joined; and a welding device configured such that, after the driving-in of the pin, to weld at least one first section of the pin to the at least one material layer composed of the metal.

In accordance with embodiments, provided is a method for joining at least two material layers, of which at least one material layer is composed of a metal, the method including at least one of the following: providing a tool including a driving-in device and a welding device; providing a fastener; driving the fastener using the drive-in device through the surface of the at least two material layers; and then welding the fastener using the welding device to the at least one metal material layer after driving the fastener.

In accordance with embodiments, provided is a method for joining at least two material layers, of which at least one material layer is composed of a metal, the method including at least one of the following: pre-stressing the material layers; driving a fastener into the material layers; and then creating a welded connection at at least one contact point between the fastener and the metal material layer after driving the fastener by conducting a welding current through the fastener.

The driving-in device of a tool in accordance with the invention is therefore designed to drive a pin through at least two material layers, in particular through all of the material layers, which are intended to be connected to one another. In this case, the driving through the material layers is understood as meaning that the tip of the pin penetrates the second material layer at least to an extent such that the tip comes to lie in the region of emergence from the second material layer. At least the tip of the pin, therefore, displaces the material of the second material layer as far as the region of emergence from said material layer. Owing to the fact that the pin is also driven into the second material layer, shearing forces from said material layer can be absorbed, and therefore a secure connection is ensured even under the action of lateral forces. For this purpose, the pin can penetrate the second material layer such that the tip of the pin already protrudes from the second material layer.

The pin may also end shortly before emerging from the second material layer, and therefore the tip of the pin does not protrude out of the material layer. For this purpose, the driving-in device has, at least temporarily, to apply a correspondingly high force in order to drive the pin through both material layers. In addition, the tool in accordance with the invention has a welding device which, after the driving-in of the pin via the driving-in device, is capable of welding at least a first section of the pin to a metal material layer. The welding is generally achieved by way of resistance welding, but other methods, for example welding by way of inductive heating, are also conceivable.

Developments of the invention are indicated in the dependent claims, the description and the attached drawings.

A tool in accordance with the invention is advantageously designed in such a manner that the welding device welds the at least first section of the pin, wherein the at least first section of the pin lies at a front end of the pin in the driving-in direction. As a result, irrespective of the type of connection of the rear pin end, the frequently pointed front part of the pin, which is driven through the material layers, is in any case welded to a metal material layer and thereby securely fixed.

In accordance with a preferred embodiment of the invention, the tool is designed in such a manner that the welding device conducts a welding current through the pin. The welding current may thereby cross non-metallic material layers by being guided along the pin which is in any case driven in.

In a further embodiment, the tool is designed in such a manner that the welding device welds both ends of the pin to one metal material layer each. Material layers which are weldable to both ends of the pin are thereby welded by the driven-in pin such that reliable support is achieved at both ends of the pin.

It is particularly advantageous for a tool in accordance with the invention if the driving-in device is designed in such a manner that the pin can be driven in pneumatically through the at least two material layers. In this manner, the required force is achieved by comparatively simple means in order to drive the pin through the at least two material layers. The driving-in device part of the tool in accordance with the invention may be designed in this case in a similar manner to a known compressed-air nail driver. As an alternative to the pneumatic design of the driving-in device, the latter, for example, may also be designed electromechanically.

A tool in accordance with the invention can advantageously be configured in such a manner that the material layers are prestressed against one another before the pin is driven in. The tool, therefore, serves to execute the following steps: pre-stressing the material layers, driving in the pin and then welding the pin to the material layers. This is advantageous since the frictional connection between the material layers is enhanced by the step of pre-stressing.

It is also advantageous if the tool is designed in such a manner that a pin which has a head at the rear and thereof in the driving-in direction is driven in by the driving-in device in such a manner that, after being driven in, the head bears against a first material layer in the driving-in direction. In this embodiment, the tool can therefore drive in a pin which is designed as a nail, with a head. The head enhances the support of the pin or of the nail against a first penetrated material layer such that this end of the pin is readily fixed even without welding.

The invention also relates to a method for connecting at least two material layers, of which at least one material layer is in the form of a metal material layer, by a pin, wherein, with a tool in accordance with the invention, the pin is driven through the at least two material layers to be connected and, after the driving-in of the pin, at least one first section of the pin is welded to a metal material layer.

For example, at least one of the material layers which is joined in a method in accordance with the invention to at least one further material layer consists of a plastic or a fibre-plastic composite, such as, for example, glass-fibre-reinforced plastic (GFRP). The method in accordance with the invention is particularly advantageous, for example, in the fastening of GFRP material to body components.

In one embodiment of the method, at least one metal material layer is formed by a metal auxiliary element. This is advantageous in particular whenever an otherwise outer material layer cannot be welded. In this case, a sheet-metal disc, or else a sheet-metal strip, can be used as an auxiliary element in order to permit welding of the pin to said auxiliary element and, by means of this welded connection, to securely fix the further material layers.

BRIEF DESCRIPTION OF THE DRAWINGS

The invention is described below by way of example with reference to the drawings, in which:

FIGS. 2a-2f illustrate the tool of FIG. 1 in various method steps and a sequence of a method in accordance with the invention.

DETAILED DESCRIPTION OF EMBODIMENTS

Figure 1:
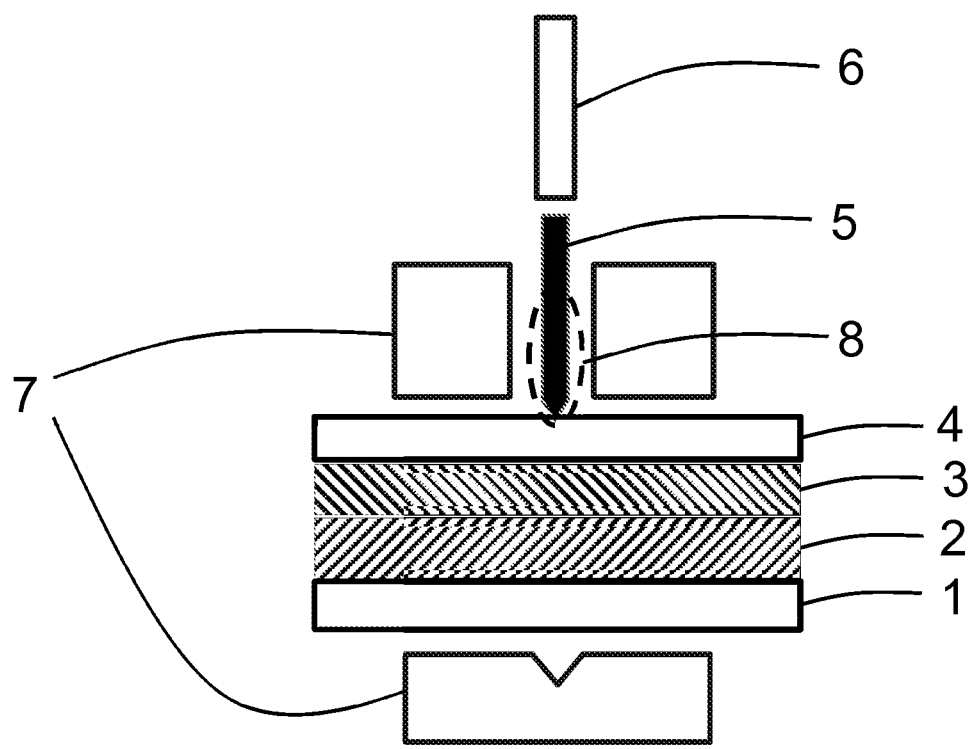
FIG. 1 is a schematic illustration of a tool in accordance with the invention.

FIG. 1 illustrates a tool in accordance with the invention which is used to join a plurality of material layers 1, 2, 3 and 4 to one another, the layers include a first, outermost layer 1, second and third inner layers 2, 3 and a fourth, outermost layer 4. In FIG. 1, the first outermost layer 1 and the fourth, outermost layer 4 are each composed of weldable material. The layer 1 is formed by the metal body, and the layer 4 which is arranged on the opposite side of the material layers corresponds to a metal add-on part, for example, a sheet-metal strip. The intermediary layers 2, 3 are glass-fibre-reinforced plastic (GFRP) or plastics parts arranged between the weldable layers 1, 4.

All of the material layers 1, 2, 3 and 4 are intended to be permanently connected to one another by a pin 5 and are not yet connected in FIG. 1. A tool in accordance with the invention includes the driving-in device 6 and a welding device 7 having an upper electrode and lower electrode are schematically illustrated. An essential element of the illustrated driving-in device 6 is the driving-in piston 6. By pressurization, such as, for example, pneumatically, of the driving-in piston 6 using a sufficient force, in a direction towards the pin 5, causes the pin 5 to be driven through the surface of all of the material layers 1, 2, 3 and 4 in the position illustrated. Of the welding device 7, the electrodes 7 are illustrated as an essential element.

After the pin 5 is driven into the material layers 1, 2, 3 and 4, the electrodes 7 are placed against the outer material layers 1 and 4 and the welding current is conducted via the electrodes of the welding device 7 through the pin 5 such that a high temperature is formed at the contact points between the pin 5 and the weldable layers 1 and 4, and therefore, the components 1 and 4 are melted and welded to the pin 5.

The tool illustrated, therefore, has a driving-in device 6 which functions, for example, in a similar manner to a known compressed-air nail driver, and a welding device 7 which functions, for example, in a similar manner to known welding tongs.

FIGS. 2a-2f illustrate the sequence of a joining method in accordance with the invention using the described tool of FIG. 1.

As illustrated in FIG. 2a, the tool, illustrated above the welding device 7 and the driving-in device 6, and the pin 5 are still in a starting position such that the pin 5 is held spatially above the material layers 1, 2, 3 and 4 to be connected. The tool is placed onto the material layers 1, 2, 3 and 4.

As illustrated in FIG. 2b, the material layers 1, 2, 3 and 4 are then prestressed by closing the electrodes of the welding device 7, which is designed, for example, in the manner of tongs.

As illustrated in FIG. 2c, the pin 5 is then driven pneumatically into the material layers 1, 2, 3 and 4 by the driving-in piston of the driving-in device 6. The state in which the pin 5 is already driven in through all four material layers 1, 2, 3 and 4 is such that a portion of the pin 5 protrudes from the surface of the outermost material layer 1 and the outermost material layer 4.

As illustrated in FIG. 2d, the driving-in piston 6 is then manipulated in a rearward direction away from the material layers 1, 2, 3 and 4, and a welding current conducted by the welding device 7 through the electrodes and the pin 5 such that a current flux 11 is conducted from one tong half of the outermost electrode via the pin 5 to the other tong half of the outermost electrode corresponding to the arrows illustrated in FIG. 2d. This results in the welds at the contact points between the material layers 1 and 4 and the pin 5, the welds being illustrated in FIGS. 2e and 2f by the welded connections 12.

As illustrated in FIG. 2e, the tool is manipulated rearward again and can then be advanced to the next joining point.

As illustrated in FIG. 2f, the material layers 1, 2, 3 and 4 are joined after the treatment, in which the welded connections 12 are formed between the pin 5 and the material layers 1 and 4, has ended.

Figure 3:
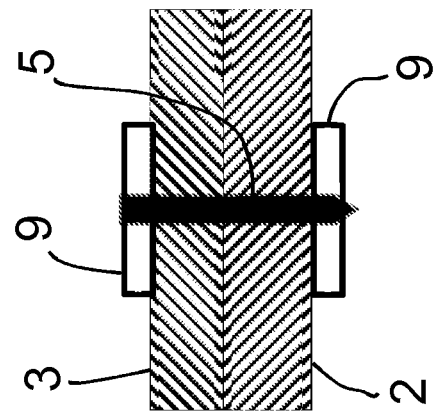
FIG. 3 illustrates material layers connected to one another in accordance with the invention.
Figure 4:
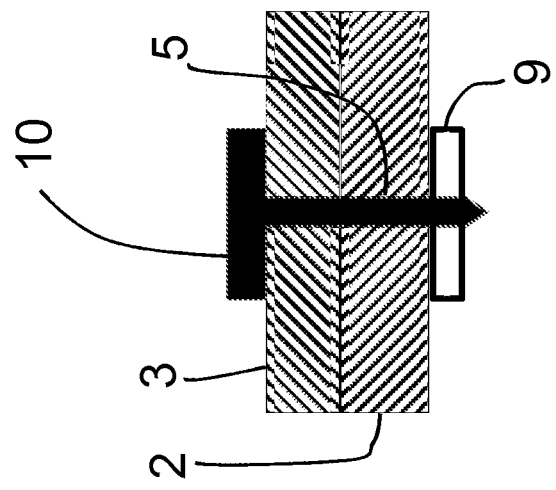
FIG. 4 illustrates material layers connected to one another in accordance with the invention.
Figure 5:
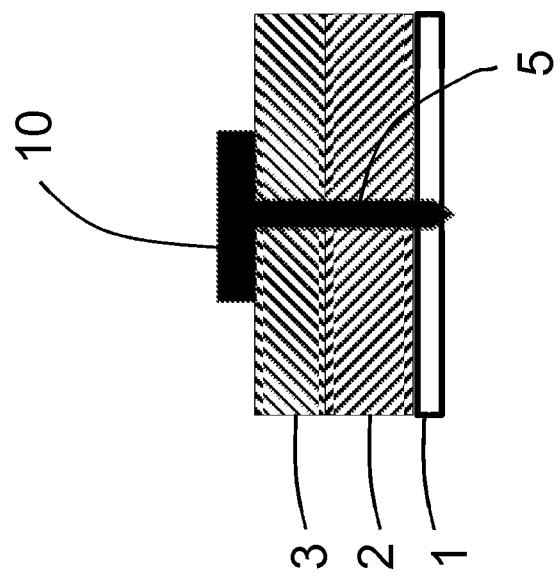
FIG. 5 illustrates material layers connected to one another in accordance with the invention.

FIGS. 3 to 5 illustrate further use possibilities of the tool in accordance with the invention for joining components. In FIG. 3, instead of a headless pin as illustrated in FIGS. 1-2, a pin 5 having a head 10, i.e., a nail, is used. As illustrated and described in FIGS. 2a-2f, the nail is driven into the material layers 1, 2 and 3 by the tool and welded by the welding device (not illustrated in FIG. 3). Since, in this exemplary embodiment, only the layer 1 is composed of a weldable material, a welded connection (not illustrated) is formed only between the outermost layer 1 and the pin 5. The outermost plastics layer 3 is fixed via the nail head 10.

In a similar manner, a nail with a head 10 is also used in FIG. 4 as the pin 5 for producing the connection between the material layers 2 and 3. In this embodiment, the flat components 2 and 3 to be joined are not weldable. For the welding, an auxiliary element 9 composed of, for example, a weldable metal material such as a sheet-metal disc, is therefore placed onto the joining point. The further connection is undertaken in the manner described above with reference to FIGS. 2a-2f using the tool in accordance with the invention. The connection is, therefore, produced at a first end by a welded connection between the pin 5 and auxiliary element 9 and at a second end of the pin 5 by the frictional connection between the head 10 and the outermost material layer 3.

In another alternative embodiment illustrated in FIG. 5, a pin 5 is used without a head. For this purpose, two auxiliary elements 9 composed of, for example, a weldable metal material such as a sheet-metal disc, are used as weldable material layers. By use of the tool in accordance with the invention, two welded connections are formed, namely a welded connection in each case between the pin 5 and each of the two auxiliary elements 9.

The tool and method in accordance with embodiments of the invention is therefore advantageous in permitting a secure connection between at least two material layers, using the tool with a driving-in device and a welding device, whereby a pin is driven in through at least two material layers and is subsequently welded to at least one metal material layer.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for joining at least two material layers in a production of a motor vehicle, of which at least one material layer is composed of a metal, the method comprising:
   providing a tool that comprises a driving-in device and a welding device;
   providing a fastener;
   driving the fastener using the drive-in device through the surface of the at least two material layers;
   manipulating the driving-in device, after driving the fastener, in a rearward direction away from the at least two material layers;
   welding the fastener using the welding device to the at least one metal material layer after driving the fastener, wherein:
      the at least two material layers include a first outermost metal material layer, a second outermost metal material layer, and a third inner non-metal material layer arranged between the first outermost metal material layer and the second outermost metal material layer, and driving the fastener comprises driving the fastener such that a portion of the fastener protrudes from the surface of first outermost material layer and the second outermost material layer,
      the fastener is an elongated pin, and
      welding the fastener comprises creating a welded connection at a first contact point between a first distal end of the elongated pin and the first outermost metal material layer and a second contact point between a second distal end of the elongated pin and the second outermost metal material layer.

2. The method of claim 1, wherein at least one of the material layers is composed of a plastic.

3. The method of claim 1, wherein at least one of the material layers is composed of a fibre-plastic composite.

4. The method of claim 3, wherein the fibre-plastic composite comprises glass-fibre-reinforced plastic.

5. The method of claim 1, wherein the at least one metal material layer is formed by a metal auxiliary element.

6. A method for producing a motor vehicle, the comprising:
   driving, using a tool comprising a driving-in device and a welding device, a fastener through materials layers that include a first outermost material layer of a body of the motor vehicle, a second outermost material layer of an add-on component of the motor vehicle, and a third inner material layer arranged between the first outermost material layer and the second outermost material layer, wherein the first outermost material layer and the second outermost material layer are each composed of a metal, and the third inner material layer is composed of a non-metal, and driving the fastener comprises driving the fastener such that a first distal end of the fastener protrudes from the surface of first outermost material layer and a second distal end of the fastener protrudes from the surface of the second outermost material layer;

manipulating the driving-in device of the tool, after driving the fastener, in a rearward direction away from the at least two material layers; and then joining, using the welding device of the tool and after manipulating the driving-in device of the tool, the first outermost material layer and the second outermost material layer by conducting a welding current through the fastener at a first contact point between the first distal end of the fastener and the first outermost metal material layer and a second contact point between the second distal end of the fastener and the third second outermost metal material layer.

7. The method of claim 6, wherein driving the fastener comprises driving the fastener through the material layers in a manner such that a portion of the fastener protrudes through the surface of the first outermost material layer and the second outermost material layer, respectively.

8. The method of claim 6, wherein conducting a welding current comprises creating the welded connection at the first contact point and the second contact point.

9. The method of claim 6, wherein the third inner non-metal material layer is composed of a plastic.

10. The method of claim 6, wherein the third inner non-metal material layer is composed of a glass-fibre-reinforced plastic (GFRP).

11. A method for producing a motor vehicle, the method comprising:

pre-stressing, using a tool comprising a driving-in device and a welding device, materials layers that include a first outermost material layer of a body of the motor vehicle, a second outermost material layer of an add-on component of the motor vehicle, and a third inner material layer arranged between the first outermost material layer and the second outermost material layer, wherein the first outermost material layer and the second outermost material layer are each composed of a metal, and the third inner material layer is composed of a non-metal, wherein the pre-stressing comprises closing an upper welding electrode and a lower welding electrode of the welding device directly against the first outermost material layer and the second outermost material layer;

driving, using the driving-in device, a fastener through the material layers;

manipulating the driving-in device, after driving the fastener, in a rearward direction away from the at least two material layers; and then creating a welded connection, using the welding device of the tool and after manipulating the driving-in device, between the first outermost material layer and the second outermost material layer by conducting a welding current through the upper welding electrode and the lower welding electrode and the fastener at a first contact point between a first distal end of the fastener and the first outermost material layer, and a second contact point between a second distal end of the fastener and the second outermost metal material layer.

12. The method of claim 11, wherein driving the fastener comprises driving the fastener through the material layers in a manner such that a portion of the fastener protrudes through the surface of the first outermost material layer and the second outermost material layer, respectively.

13. The method of claim 11, wherein conducting a welding current comprises creating the welded connection at the first contact point and the second contact point.

14. The method of claim 11, wherein the third inner non-metal material layer is composed of a plastic.

15. The method of claim 11, wherein the third inner material layer is composed of glass-fibre-reinforced plastic (GFRP).

* * * * *